(12) United States Patent  (10) Patent No.: US 8,975,554 B2
Kawahara et al.  (45) Date of Patent: Mar. 10, 2015

(54) WIRE ELECTRIC DISCHARGE MACHINE CAPABLE OF DETECTING MACHINING STATE

(75) Inventors: Akiyoshi Kawahara, Yamanashi (JP); Masao Murai, Yamanashi (JP); Tomoyuki Furuta, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 882 days.

(21) Appl. No.: 13/151,769

(22) Filed: Jun. 2, 2011

(65) Prior Publication Data

US 2012/0048833 A1  Mar. 1, 2012

(30) Foreign Application Priority Data

Aug. 26, 2010 (JP) ................... 2010-189521

(51) Int. Cl.
*B23H 1/02* (2006.01)
*B23H 7/04* (2006.01)

(52) U.S. Cl.
CPC ............... *B23H 1/022* (2013.01); *B23H 1/024* (2013.01); *B23H 7/04* (2013.01)
USPC .................... 219/69.12; 219/69.13

(58) Field of Classification Search
CPC ........... B23H 1/024; B23H 1/02; B23H 7/16; B23H 7/04
USPC ...................... 219/69.13, 69.18, 69.12, 69.16
See application file for complete search history.

(56) References Cited

U.S. PATENT DOCUMENTS 3,705,286 A * 12/1972 Kondo et al. ............ 219/69.13
4,303,957 A * 12/1981 Bell et al. ................ 219/69.19
4,481,095 A   11/1984 Inoue
4,504,722 A *  3/1985 Kishi et al. ............... 219/69.18
4,798,929 A *  1/1989 Itoh ......................... 219/69.12
5,496,984 A *  3/1996 Goto et al. ................ 219/69.18
5,545,870 A    8/1996 Fujii et al.
5,751,155 A    5/1998 Akamatsu
5,756,955 A    5/1998 Goto
6,756,557 B1 * 6/2004 Ukai et al. ................ 219/69.13

(Continued)

FOREIGN PATENT DOCUMENTS

CH     536679 A    5/1973
EP   1533065 A1    5/2005

(Continued)

OTHER PUBLICATIONS

Office Action mailed Jan. 13, 2014, corresponds to Chinese patent application No. 201110253651.8.

(Continued)

*Primary Examiner* — Geoffrey S Evans
(74) *Attorney, Agent, or Firm* — Lowe Hauptman & Ham, LLP

(57) ABSTRACT

A voltage is applied to a machining gap between a wire electrode and a workpiece for a period of one microsecond or less with a quiescent time longer than the duration of voltage application between each two adjacent cycles of voltage application provided, and the number of duty cycles and a machining-gap voltage are detected. An open-circuit state in which electric discharge does not occur after the voltage is applied is identified by the detected machining-gap voltage, and the number of open-circuits is counted. An average machining-gap voltage is obtained based on the numbers of duty cycles and open-circuits and the supply voltage or an average voltage for each duty cycle.

5 Claims, 4 Drawing Sheets

(56) References Cited

U.S. PATENT DOCUMENTS

| | | | |
|---|---|---|---|
| 6,930,273 B2 * | 8/2005 | Nakashima et al. | 219/69.13 |
| 6,980,879 B2 | 12/2005 | Kurihara et al. | |
| 7,038,158 B2 | 5/2006 | Goto et al. | |
| 8,735,762 B2 * | 5/2014 | Murai et al. | 219/69.12 |
| 2003/0132200 A1 | 7/2003 | Nakashima | |
| 2004/0075966 A1 * | 4/2004 | Murai et al. | 361/212 |
| 2005/0127041 A1 | 6/2005 | Kobayashi et al. | |
| 2008/0110865 A1 * | 5/2008 | Hashimoto et al. | 219/69.12 |
| 2008/0203068 A1 * | 8/2008 | Ukai et al. | 219/69.13 |
| 2009/0134126 A1 | 5/2009 | Katougi et al. | |
| 2013/0193112 A1 * | 8/2013 | Murai et al. | 219/69.12 |

FOREIGN PATENT DOCUMENTS

| | | | |
|---|---|---|---|
| JP | 51-15896 | | 2/1976 |
| JP | S5344993 A | | 4/1978 |
| JP | 54-159795 A | * | 12/1979 |
| JP | 61260915 A | | 11/1986 |
| JP | 63-185521 A | | 8/1988 |
| JP | S645725 A | | 1/1989 |
| JP | 1-97522 A | | 4/1989 |
| JP | 8-118146 A | | 5/1996 |
| JP | 9-38829 A | | 2/1997 |
| JP | 9-248718 A | * | 9/1997 |
| JP | 2002254250 A | | 9/2002 |
| JP | 2010012551 A | | 1/2010 |
| WO | 8911371 A1 | | 11/1989 |
| WO | 02/058874 A1 | | 8/2002 |
| WO | 03/106088 A1 | | 12/2003 |
| WO | 2004022275 A1 | | 3/2004 |
| WO | 2005/072900 A1 | | 8/2005 |

OTHER PUBLICATIONS

An EP Search Report, dated Aug. 30, 2012, in EP Application No. 12172865.3.

EPO Partial Search Report (R. 64 EPC), Application No. 11168391.8-1262, dated Nov. 28, 2011.

JP2012-104460 Decision to Grant mailed Aug. 6, 2013.

Japanese Office Action mailed Oct. 18, 2011 in JP Patent Application No. 2010-189521.

* cited by examiner

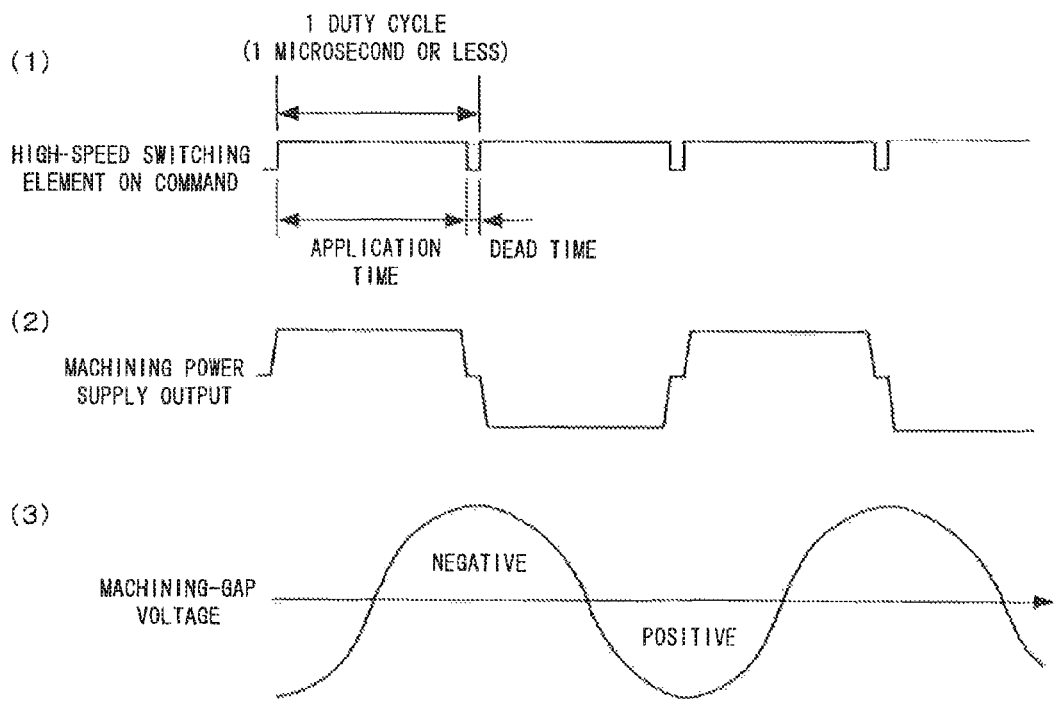

WIRE ELECTRIC DISCHARGE MACHINE CAPABLE OF DETECTING MACHINING STATE

RELATED APPLICATIONS

The present application is based on, and claims priority from, Japanese Application Number 2010-189521, filed Aug. 26, 2010, the disclosure of which is hereby incorporated by reference herein in its entirety.

BACKGROUND OF THE INVENTION

1. Field of the Invention

The present invention relates to a wire electric discharge machine capable of detecting a machining state without being easily influenced by variation in a machining-gap voltage detection circuit in each machine.

2. Description of the Related Art

In a wire electric discharge machine, a voltage is applied to a machining gap between a wire electrode and a workpiece opposite each other to generate electric discharge. At the same time, the relative positions of the wire electrode and the workpiece are changed so that the workpiece is machined into a desired shape. Since discharge craters produced by electric discharge are collected to form a machined surface, the surface roughness of the workpiece depends on the size of each individual discharge crater. It is known, therefore, that a good machined surface can be obtained by applying a high-frequency voltage to the machining gap and frequently repeating electric discharge of a short time duration. For example, Japanese Patent Application Laid-Open No. 61-260915 discloses how a machined surface with a surface roughness of 1 μm Rmax or less can be obtained by machining a workpiece by applying a high-frequency AC voltage of 1 to 5 MHz to a machining gap.

Finish machining is expected to correct the shape of a rough-machined workpiece more precisely. Those portions which are made larger than a target size after rough machining need to be control led so that the machining amount increases during finish machining. In contrast, those portions which are made smaller than the target size after rough machining need to be controlled so that the machining amount is reduced after finish machining. Specifically, it is necessary to determine according to the machining state whether or not the target size is exceeded during finish machining. Based on the result of this detection, the relative positions of the wire electrode and the workpiece and machining conditions need to be controlled or changed.

FIG. 7 shows a typical high-frequency voltage waveform. As shown in (1) of FIG. 7, a necessary minimum dead time is provided between each two adjacent cycles of voltage application so that a bridge circuit in a power supply circuit is not shorted. A machining-gap voltage has a sinusoidal waveform, as shown in (3) of FIG. 7.

The average of the absolute value of a machining-gap voltage is the most typical index indicative of the machining state. Since an average machining-gap voltage substantially represents the distance of a gap between a wire electrode and a workpiece, a high-precision machining shape can be obtained by controlling axis feed in a manner such that the average machining-gap voltage is constant. If finish machining is performed by applying the high-frequency voltage shown in FIG. 7 to the machining gap, in order to obtain a satisfactory surface roughness, however, the response of a machining-gap voltage detection circuit is degraded in a high-frequency region, so that it is difficult to obtain accurate average, voltage data. Since variation in the component characteristics of the detection circuit is substantial in the high-frequency region, moreover, detected values vary according to the machine. If the axis feed control is performed based on such data, the result of machining inevitably varies depending on the machine.

To overcome this, International Publication No. 2004/022275 discloses a technique in which a DC voltage is superposed on an AC high-frequency voltage to be applied, and only a low-frequency voltage component of a machining-gap voltage is extracted by means of a low-pass filter. The feed of a wire electrode is controlled according to the change of the extracted voltage component. Since the average voltage cannot be reduced to zero according to this technique, electrolytic corrosion may possibly occur in a workpiece or machine body. Since the low-pass filter is used, moreover, the response is too poor to enable follow-up in case of a sudden change of the electric-discharge state.

The frequency of electric discharge per unit time is an index other than the average voltage. Japanese Patent Application Laid-Open No. 2002-254250 discloses a technique for controlling the axis feed rate and quiescent time based on the frequency of electric discharge. To this end, the machining-gap state needs to be classified into three states; open-circuit state, electric-discharge state, and short-circuit state. In the open-circuit state, electric discharge is not performed at all after the voltage application. In the open-circuit state, the wire electrode and the workpiece contact each other so that electric discharge does not occur. Thus, machining is not effected in either of these states.

If a high-frequency voltage of a sinusoidal waveform is applied, as shown in FIG. 7, however, an application time in each duty cycle (application time plus dead time) is very long ((1) of FIG. 7). Even if electric discharge occurs, therefore, a voltage is applied immediately when insulation in the machining gap is recovered, so that the machining-gap voltage inevitably increases. Consequently, the time during which the machining-gap voltage is actually reduced becomes short. The detection circuit cannot respond to such a very high frequency, so that the electric-discharge and open-circuit states cannot be distinguished from each other.

Thus, in the prior art, the detected machining-gap voltage is the only factor that can be used as an index for a high-frequency machining state. In the high-frequency region, however, the detected value of the machining-gap voltage varies according to the wire electric discharge machine, under the influence of the variation in the response and component characteristics of the detection circuit. Thus, the result of machining inevitably varies.

SUMMARY OF THE INVENTION

Accordingly, in consideration of these problems of the prior art, the object of the present invention is to provide as wire electric discharge machine capable of detecting a machining state without being easily influenced by variation in a machining-gap voltage detection circuit in each machine.

A wire electric discharge machine according to the present invention applies a high-frequency voltage to a machining gap between a wire electrode and a workpiece located at a predetermined distance from the wire electrode, thereby generating electric discharge to machine the workpiece. This wire electric discharge machine comprises voltage application means which applies a bipolar voltage to the machining gap between the wire electrode and the workpiece for a period of one microsecond or less with a down time longer than the duration of voltage application between each two adjacent cycles of voltage application provided; machining-gap voltage detection means for detecting a machining-gap voltage produced in the machining gap; duty cycle number counting means for counting the number of duty cycles of the voltage applied by the voltage application means for each unit time; open-circuit state identification means for identifying an open-circuit state where no electric discharge occurs after the voltage is applied, based on the machining-gap voltage detected by the machining-gap voltage detection means; and open-circuit number counting means for counting the number of open-circuits identified by the open-circuit state identification means for each unit time.

In an aspect of the wire electric discharge machine described above, an average machining-gap voltage is obtained based on the number of duty cycles per unit time counted by the duty cycle number counting means, the number of open-circuits per unit time counted by the open-circuit number counting means, and a supply voltage or an average voltage for each duty cycle.

The open-circuit state identification means may compare a full-wave-rectified machining-gap voltage waveform with a predetermined reference voltage within the quiescent time identify the open-circuit state if the reference voltage is exceeded, and identify a closed-circuit state if the reference voltage is not reached, in contrast.

In another aspect of the wire electric discharge machine, an electric-discharge ratio is obtained from an open-circuit ratio, which is calculated based on the number of duty cycles per unit time counted by the duty cycle number counting means and the number of open-circuits per unit time counted by the open-circuit number counting means, and a relation of electric discharge and short-circuit ratios to the open-circuit ratio within unit time, and a frequency of electric discharge per unit time or distance is obtained based on the counted number of duty cycles per unit time and the obtained electric-discharge ratio.

The frequency of electric discharge and the number of short-circuits per unit time may be obtained based on the electric-discharge ratio, the short-circuit ratio, and the number of duty cycles per unit time, whereby a machining amount per unit time or distance may be obtained.

The open-circuit state identification means may compare a full-wave-rectified machining-gap voltage waveform with a predetermined reference voltage within the quiescent time, identify the open-circuit state it the reference voltage is exceeded, and identify a closed-circuit state if the reference voltage is not reached, in contrast.

According to the present invention, there may be provided a wire electric discharge machine, which cannot be easily influenced by variation in a machining-gap voltage detection circuit in each machine.

BRIEF DESCRIPTION OF THE DRAWINGS

The above and other objects and features of the present invention will be obvious from the ensuing description of embodiments with reference to the accompanying drawings, in which:

FIG. 7 is a diagram illustrating an example of a typical high-frequency voltage.

DETAILED DESCRIPTION OF THE PREFERRED EMBODIMENTS

Figure 1:
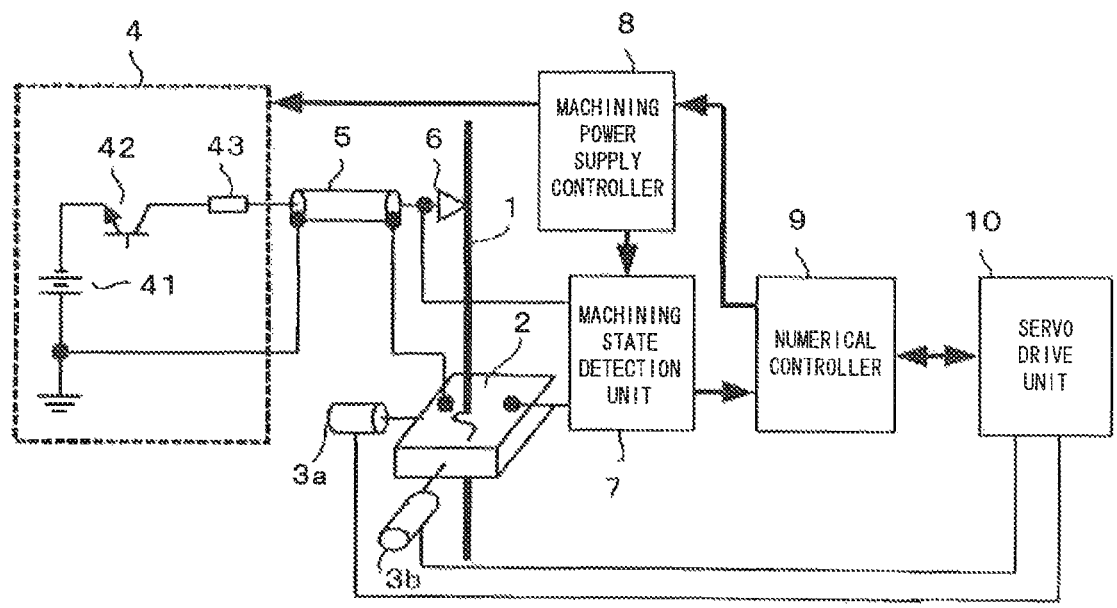
FIG. 1 is a schematic configuration diagram of a wire electric discharge machine according to the present invention.

FIG. 1 is a schematic configuration diagram of a wire electric discharge machine. An electric discharge machining unit in the wire electric discharge machine is provided with a working tank not shown) in a traveling path of a wire electrode 1. The working tank is filled with a working fluid. The wire electrode 1 and a workpiece 2 are connected to a machining power source 4, for use as a high-frequency power supply device for wire electric discharge machining, by a feeder 5 as a working voltage supply cable.

The machining power source 4 comprises a DC voltage source 41, a high-speed switching element 42 that constitutes a bridge circuit, and a current limiting resistor 43. Based on a command from a machining power supply controller 8, the machining power source 4 applies a machining power supply output (see FIG. 2) to a machining gap between the wire electrode 1 and the workpiece 2 through the feeder 5 and a feeding portion 6.

The machining power supply controller 8 receives commands associated with the application time, quiescent time, and detection time from a numerical controller 9. The machining power supply controller 8 controls the machining power source 4 in response to the commands from the numerical controller 9. The control unit 8 generates a pulse for each duty cycle corresponding to the detection time. The application time, quiescent time, and detection time will be described later with reference to FIGS. 2, 4 and 5.

A machining state detection unit 7 detects a voltage produced in the machining gap between the wire electrode 1 and the workpiece 2. Based on the detected value of the voltage in the machining gap, the number of duty cycles and the number of open-circuits per unit time are calculated by a decision circuit, which will be described later with reference to FIG. 5. Data on the calculated number of duty cycles and the number of open-circuits per unit time are delivered to the numerical controller 9.

The numerical controller 9 controls a servo drive unit 10, based on the number of duty cycles and the number of open-circuits per unit time delivered from the machining state detection unit 7. The servo drive unit 10 drives a servomotor (not shown) to move the wire electrode 1 with respect to the workpiece 2, thereby performing electric discharge machining on the workpiece 2.

Figure 2:
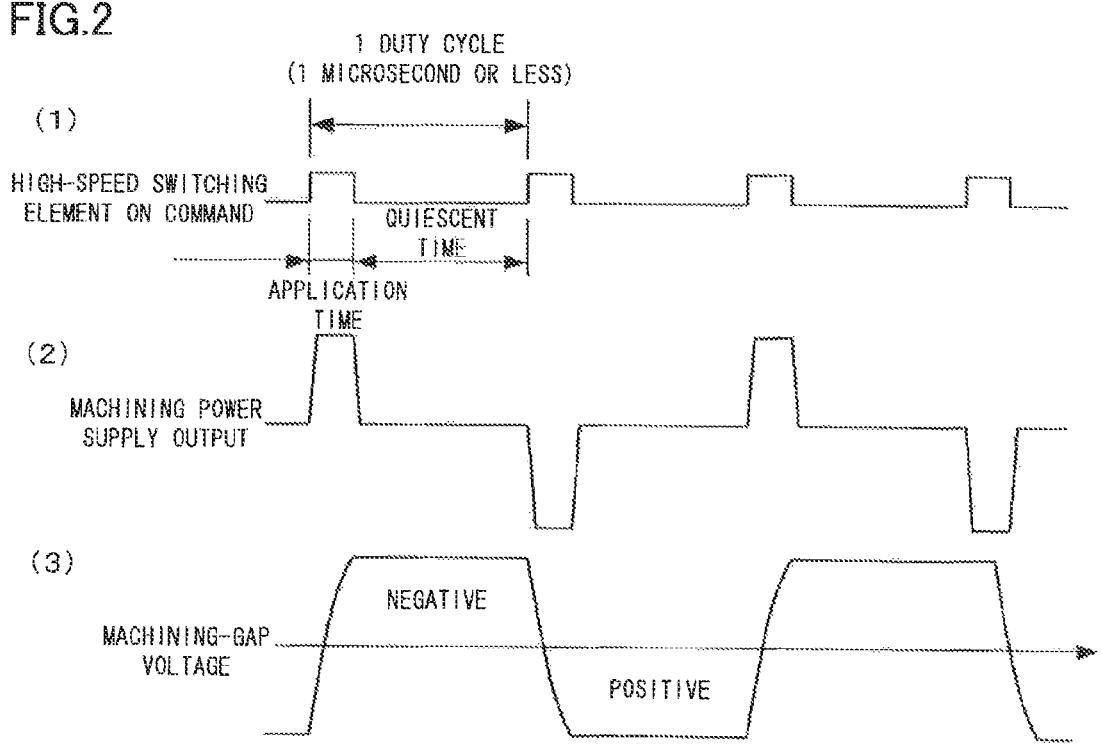
FIG. 2 is a diagram illustrating an example in which a bipolar voltage is applied to a machining gap between a wire electrode and a workpiece for a period of one microsecond or less with a quiescent time longer than the duration of voltage application between each two adjacent cycles of voltage application.

FIG. 2 is a diagram illustrating an example in which a bipolar voltage is applied to a machining gap between the wire electrode 1 and the workpiece 2 for a period of one microsecond or less with a quiescent time longer than the duration of voltage application between each two adjacent cycles of voltage application.

In FIG. 2, (1) represents an on-command for a high-speed switching element 42 shown in FIG. 1, (2) represents the waveform of a machining power supply output delivered from the machining power source 4, and (3) represents the waveform of a machining-gap voltage produced by the machining power supply output and applied to the machining gap. Although positive and negative voltage components are shown to be alternately applied in FIG. 2, two or more positive or negative voltage components may be consecutively applied. According to this system, a stray capacitance exists in the machining gap and the feeder 5. If electric discharge does not occur, reductions in voltage are negligible. Consequently, the voltage waveform during the quiescent time is flat, as indicated by (3) of FIG. 2, and the waveform of the machining-gap voltage is trapezoidal.

Figure 3:
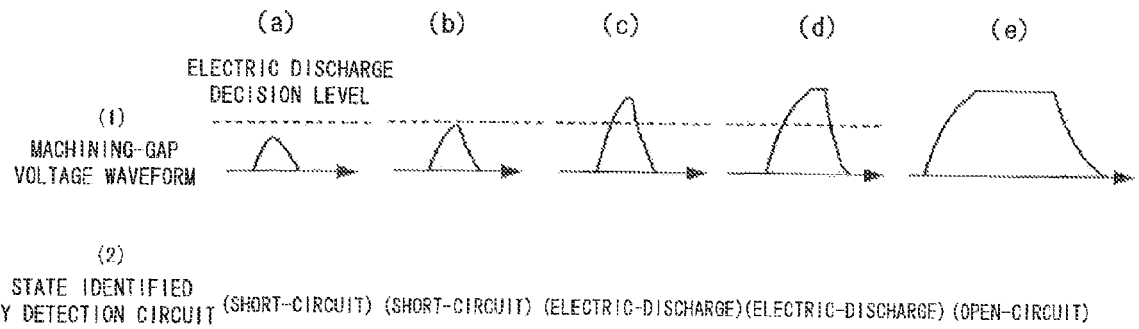
FIG. 3 is a diagram illustrating various examples of the waveform of the voltage applied to the machining gap during electric discharge machining.

Even in this trapezoidal machining-gap voltage, however, it is difficult to distinguish between short-circuit and electric-discharge states. This is because similar voltage waveforms are obtained at the time of a short-circuit and when electric discharge is generated soon after an arc voltage is reached after voltage application. Specifically, one of a pair of cables through which the machining-gap voltage is fed to the machining state detection unit 7 is mounted on the feeding portion 6 of FIG. 1, and the other is mounted on a table (not shown) to which the workpiece 2 is secured. A machining-gap impedance consists mainly of the contact impedances between a feeder (not shown) of the feeding portion 6 and the wire electrode 1, the impedance of the wire electrode 1 itself, the contact impedances between the wire electrode 1 and the workpiece 2, and the contact impedances between the workpiece 2 and the table. The higher the frequency, the higher these impedances are. At a high frequency, in particular, therefore, a voltage is produced in the machining gap even in case of a short-circuit, so that the short-circuit cannot be easily distinguished from electric discharge. In FIG. 3, (1) represents examples of such machining-gap voltage waveforms. In an example of a method for discrimination between short-circuit and electric-discharge states, a short-circuit is identified if a predetermined electric discharge decision level has never been exceeded, and electric discharge is identified once the predetermined decision level is exceeded. An open-circuit can be definitely identified in the manner described later.

Variations in the response and component characteristics of a detection circuit are very influential at a high frequency, as in the case of an average machining-gap voltage. As indicated by a dotted line in (1) of FIG. 3, therefore, the electric discharge decision level needs to be increased to a level free from the influence of variation in waveforms at the time of a short-circuit, in the cases of electric discharge waveforms (b) and (c) in (1) of FIG. 3, however, the decision, whether a short-circuit or electric discharge, also depends on the machine due to the influence of the variation in the response and component characteristics of the detection circuit. Thus, the result of machining varies depending on the machine, though not to such a degree as in the case of the average voltage.

According to the present invention, therefore, only an open-circuit state (machining can voltage waveform (e) in (2) of FIG. 3) is detected from the machining-gap voltage by using a method (see (1) of FIG. 2) in which a nigh-frequency voltage is applied with a quiescent time provided between each two adjacent cycles of voltage application. Based on the result of this detection, axis feed control is performed for the wire electric discharge machine. By using this system, the electric discharge machine of the present invention can avoid the influence of the variation in the detection circuit, so that the result of machining becomes uniform.

A method of identifying an open-circuit state in the machining using the machining-gap voltage application method shown in FIG. 2 will now be described with reference to FIG. 4. In this case, each duty cycle is assumed to be a period from the start of voltage application of a positive or negative voltage to the start of voltage application of another positive or negative voltage, including a quiescent time interposed therebetween. V1 represents an open-circuit decision level. T1 represents a time duration from the start of voltage application until an open-circuit is identified within each duty cycle. The open-circuit decision level V1 should optimally be about 50 to 60% of the supply voltage. In the open-circuit state, the absolute value of the machining-gap voltage exceeds the decision level V1 when the time duration T1 has elapsed since the start of voltage application. In an electric-discharge or short-circuit state, in contrast the absolute value of the machining-gap voltage is lower than the decision level V1 when the time duration T1 has elapsed since the start of voltage application. In order to detect the open-circuit state by high-frequency voltage application, therefore, it is very effective to use the voltage application method as shown in FIG. 2 in which a quiescent time is provided.

Figure 4:
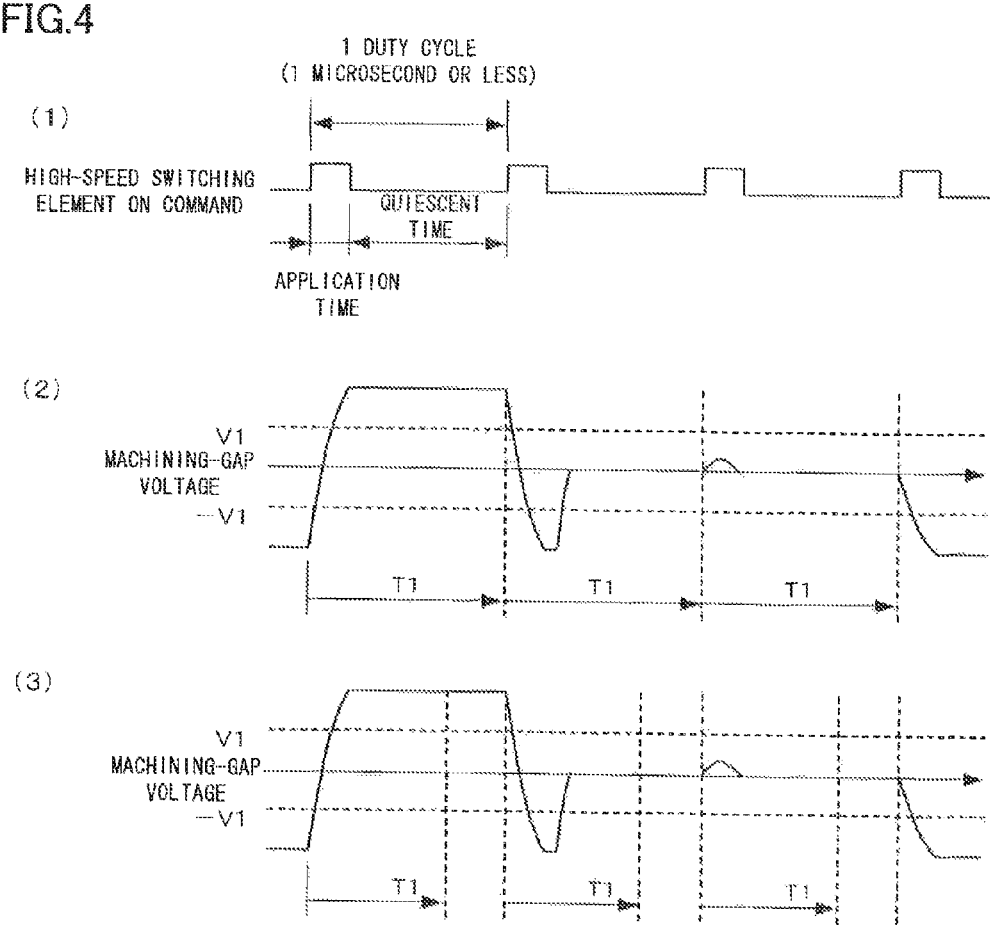
FIG. 4 is a diagram showing a method of identifying an open-circuit state in the machining using the machining-gap voltage application method shown in FIG. 2.

In (2) of FIG. 4, each duty cycle is shown to terminate when the time duration T1 has elapsed since the start of voltage application. As shown in (3) of FIG. 4, however, the point in time when the time duration T1 has elapsed since the start of voltage application may be assumed to be any point during the quiescent time before the end of each duty cycle.

Figure 5:
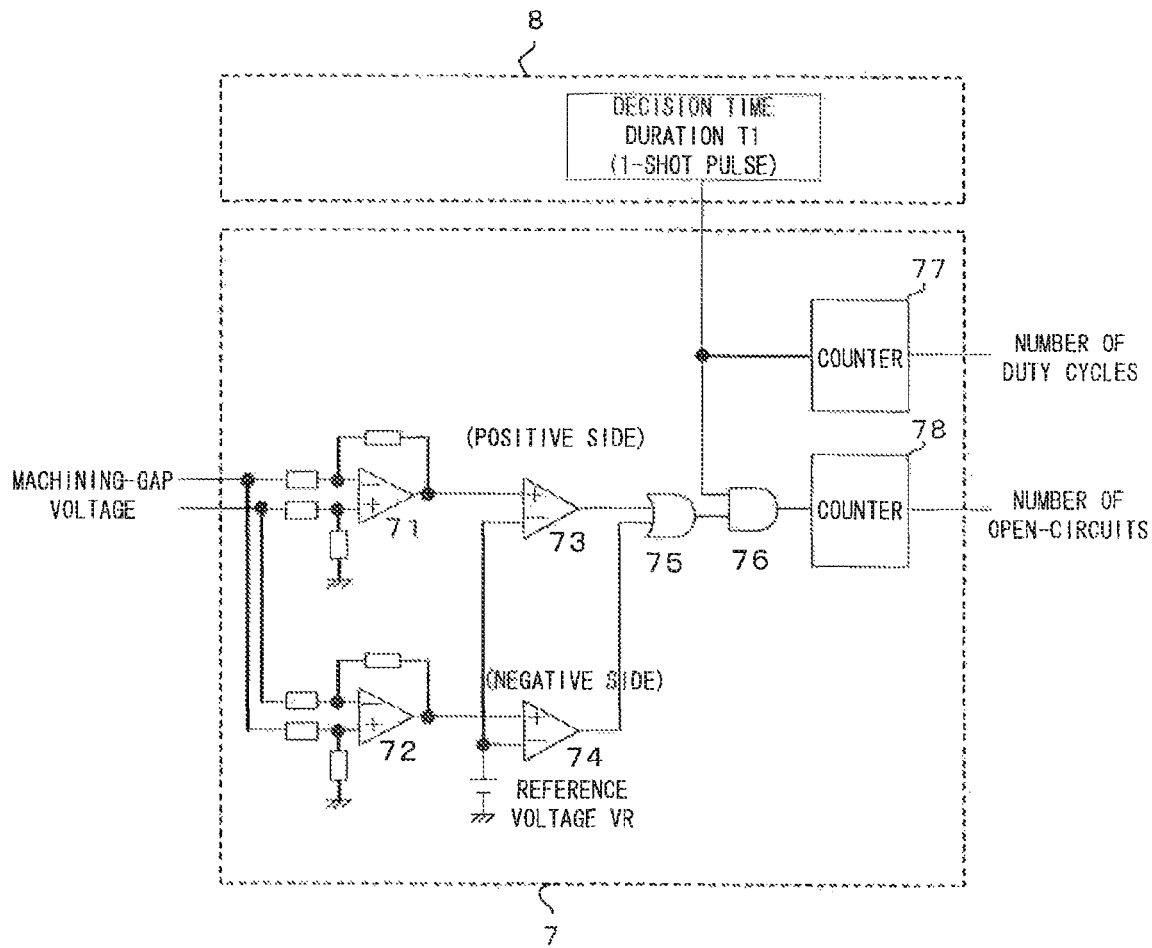
FIG. 5 is a diagram showing a decision circuit for identifying the open-circuit state of the machining gap by a detected value of a voltage produced in the machining gap and a counter for counting the number of open-circuits identified by the decision circuit.

FIG. 5 shows an example of the decision circuit for identifying the open-circuit state of the machining gap.

The machining state detection unit 7 is provided with the decision circuit. The machining-gap voltage is input to a differential amplifier circuit that comprises first and second operational amplifiers 71 and 72, and is amplified or attenuated to a predetermined level. A voltage of a polarity opposite to that of a voltage input to the first operational amplifier 71 is input to the second operational amplifier 72.

The open-circuit decision level V1 and the machining-gap voltage, which is amplified or attenuated by the differential amplifier circuit that comprises the first and second operational amplifiers 71 and 72, are input to comparators 73 and 74. Then, the levels of output signals from the operational amplifiers 71 and 72 are read when the time duration T1 has elapsed since the start of voltage application. The open-circuit state is identified if the output level of at least one of the comparators 73 and 74 is high, while the electric-discharge or short-circuit state is identified if both outputs are high. The open-circuit decision level V1 shown in (2) and (3) of FIG. 4 is given by a reference voltage VR in FIG. 5. The respective outputs of the first and second comparators 73 and 74 are input to an OR gate 75, and their logical sum is output from the OR gate 75 to an AND gate 76. The AND gate 76 also receives pulses that are generated at a predetermined point in time within a quiescent time after the voltage application during each duty cycle. The AND gate 76 outputs a high signal if the open-circuit state is identified by the first or second comparator 73 or 74. A second counter 73 counts the number of high signals (or the number of open-circuits) output from the AND gate 76. On the other hand, a first counter 77 obtains the number of duty cycles by counting the number of pulses generated during each duty cycle.

The number of open-circuits is counted for each unit time by the second counter 78, and the result of this counting is transferred to the numerical controller 9 (FIG. 1). Thereupon, the numerical controller 9 can obtain the number of open-circuits per unit time. At the same time, the number of duty cycles is counted for each unit time by the first counter 77, and the result of this counting is transferred to the numerical controller 9. Thereupon, the numerical controller 9 can obtain the number of duty cycles. Thus, the ratio of the number of open-circuits to the number of duty cycles, that is, an open-circuit ratio, can be calculated by the first and second counters 77 and 78. Based on the number of open-circuits per unit time, moreover, the average machining-gap voltage can be approximately obtained according to the following approximate equations (1) and (2).

$$\text{Average voltage} \approx (\text{supply voltage}) \times (\text{number of open-circuits per unit time}) \div (\text{number of duty cycles per unit time}), \quad (1)$$

$$\text{Average voltage} \approx (\text{average voltage for each duty cycle}) \times (\text{number of open-circuits per unit time}) \div (\text{number of duty cycles per unit time}). \quad (2)$$

For the average voltage for each duty cycle, a value corresponding to machining conditions needs to be experimentally obtained in advance. The average voltage calculated according to equation (1) or (2) is very little influenced by the variation in the detection circuit in each machine that is problematic in the prior art. Thus, a uniform machining precision which would no vary widely according to a machine can be obtained by controlling axis feed such that the average voltage is constant.

The following is a description of a method for obtaining the frequency of electric discharge and the number of short-circuits based on the open-circuit ratio. An experiment revealed that electric-discharge and short-circuit ratios within unit time are determined substantially depending on the open-circuit ratio within unit time (see FIG. 6). In addition, it was found that the relation of the electric-discharge and short-circuit ratios to the open-circuit ratio within unit time hardly changes depending on the machine. In the experiment, the machining-gap voltage was measured by means of a voltage waveform measuring device capable of high-precision measurement, and the state of electric discharge was determined. The result of the experiment revealed that the frequency of electric discharge and the number of short-circuits per unit time can be estimated by detecting only definitely identifiable open-circuit states.

$$\text{Number of open-circuits} = \text{number of duty cycles} \times \text{open-circuit ratio}, \quad (3)$$

$$\text{Frequency of electric discharge} = \text{number of duty cycles} \times \text{electric-discharge ratio}, \quad (4)$$

$$\text{Number of short-circuits} = \text{number of duty cycles} \times \text{short-circuit ratio}. \quad (5)$$

Figure 6:
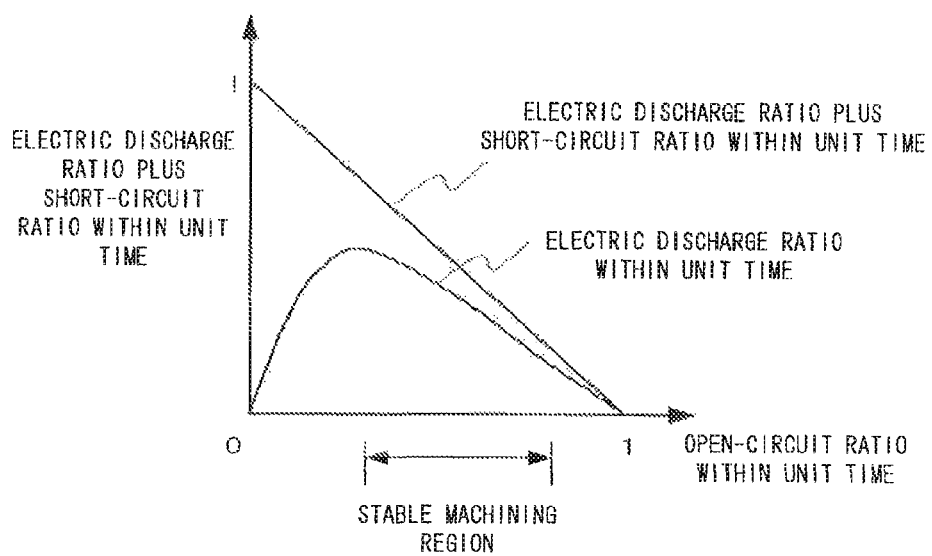
FIG. 6 is a diagram illustrating the relation between an open-circuit ratio within unit time and electric-discharge and short-circuit ratios within unit time.

There is a relation, electric-discharge ratio+short-circuit ratio=1−open-circuit ratio, and the electric-discharge ratio and short-circuit ratio within unit time can be obtained based on the "electric-discharge ratio within unit time" and measured "open-circuit ratio within unit time" shown in the graph of FIG. 6.

As indicated by machining-gap voltage waveforms (a) to (e) shown in (1) of FIG. 3, there are electric discharge cycles of various energies, and a machining amount obtained by each electric discharge cycle is not constant. Based on this circumstance, the amounts given by the following approximate equations (6) and (7) may possibly be used as indices representative of machining states. These indices approximately represent machining amounts per unit time.

$$(\text{Machining amount per unit time}) \approx \alpha \times (\text{frequency of electric discharge per unit time}) + \beta \times (\text{number of short-circuits per unit time}), \quad (6)$$

$$(\text{Machining amount per unit distance}) \approx (\text{machining amount per unit time}) \div (\text{movement distance per unit time}). \quad (7)$$

In equation (6), $\alpha$ and $\beta$ are experimentally obtained constants that represent the degrees to which a single electric discharge cycle and a single short circuit contribute to machining, respectively. In general, the value of $\beta$ is zero. These machining amounts are very little influenced by the variation in the detection circuit in each machine that is problematic in the prior art. Thus, uniform machining precision which would not vary according to a machine can be obtained by controlling axis feed such that the machining amount per unit distance is constant, for example.

Both the frequency of electric discharge per unit time and the average voltage obtained in this manner are conventionally used for axis feed control for high-precision machining at normal frequencies. Therefore, a control algorithm (software) of the wire electric discharge machine accumulated in the past can be diverted directly to this purpose.

The invention claimed is:

1. A wire electric discharge machine configured to apply a high-frequency voltage to a machining gap between a wire electrode and a workpiece located at a predetermined distance from the wire electrode, thereby generating electric discharge to machine the workpiece, the wire electric discharge machine comprising:
    a voltage application unit configured to apply a bipolar voltage to the machining gap between the wire electrode and the workpiece for a period of one microsecond or less with a quiescent time longer than the duration of voltage application between each two adjacent cycles of voltage application provided;
    a machining-gap voltage detection unit configured to detect a machining-gap voltage produced in the machining gap;
    a duty cycle number counting unit configured to count the number of duty cycles of the voltage applied by the voltage application unit for each unit time;
    an open-circuit state identification unit configured to identify an open-circuit state where no electric discharge occurs after the voltage is applied, based on the machining-gap voltage detected by the machining-gap voltage detection unit; and
    an open-circuit number counting unit configured to count the number of open-circuits identified by the open-circuit state identification unit for each unit time,
    wherein an average machining-gap voltage is obtained based on (i) the number of duty cycles per unit time counted by the duty cycle number counting unit, (ii) the number of open-circuits per unit time counted by the open-circuit number counting unit, and (iii) a supply voltage or an average voltage for each duty cycle.

2. The wire electric discharge machine according to claim 1, wherein the open-circuit state identification unit configured to
    compare a full-wave-rectified machining-gap voltage waveform with a predetermined reference voltage within the quiescent time,
    identify the open-circuit state if the reference voltage is exceeded by the full-wave-rectified machining-gap voltage waveform, and identify a closed-circuit state if the reference voltage is not reached by the full-wave-rectified machining-gap voltage waveform.

3. A wire electric discharge machine configured to apply a high-frequency voltage to a machining gap between a wire electrode and a workpiece located at a predetermined distance from the wire electrode, thereby generating electric discharge to machine the workpiece, the wire electric discharge machine comprising:
- a voltage application unit configured to apply a bipolar voltage to the machining gap between the wire electrode and the workplace for a period of one microsecond or less with a quiescent time longer than the duration of voltage application between each two adjacent cycles of voltage application provided;
- a machining-gap voltage detection unit configured to detect a machining-gap voltage produced in the machining gap;
- a duty cycle number counting unit configured to count the number of duty cycles of the voltage applied by the voltage application unit for each unit time;
- an open-circuit state identification unit configured to identify an open-circuit state where no electric discharge occurs after the voltage is applied, based on the machining-gap voltage detected by the machining-gap voltage detection unit; and
- an open-circuit number counting unit configured to count the number of open-circuits identified by the open-circuit state identification unit for each unit time, wherein
- an electric-discharge ratio is obtained from (i) an open-circuit ratio, which is calculated based on the number of duty cycles per unit time counted by the duty cycle number counting unit and the number of open-circuits per unit time counted by the open-circuit number counting unit, (ii) a short-circuit ratio, and (iii) a relation of the electric discharge ratio and the short-circuit ratio to the open-circuit ratio within unit time, and
- a frequency of electric discharge per unit time or per unit distance is obtained based on (a) the counted number of duty cycles per unit time and (b) the obtained electric-discharge ratio.

4. The wire electric discharge machine according to claim 3, wherein
- the number of short-circuits per unit time is obtained based on the number of duty cycles per unit time and the short-circuit ratio, and
- a machining amount per unit time or per unit distance is obtained based on the frequency of electric discharge per unit time and the number of short-circuits per unit time.

5. The wire electric discharge machine according to claim 3, wherein the open-circuit state identification unit is configured to
- compare a full-wave-rectified machining-gap voltage waveform with a predetermined reference voltage within the quiescent time,
- identifies the open-circuit state if the reference voltage is exceeded by the full-wave-rectified machining-gap voltage waveform, and
- identify a closed-circuit state if the reference voltage is not reached by the full-wave-rectified machining-gap voltage waveform.

* * * * *